(12) United States Patent
O'Donnell et al.

(10) Patent No.: US 9,161,660 B2
(45) Date of Patent: Oct. 20, 2015

(54) BURNER

(75) Inventors: Michael J. O'Donnell, Avon, OH (US); Richard D. Cook, North Ridgeville, OH (US)

(73) Assignee: Beckett Gas, Inc., North Ridgeville, OH (US)

(*) Notice: Subject to any disclaimer, the term of this patent is extended or adjusted under 35 U.S.C. 154(b) by 1144 days.

(21) Appl. No.: 13/056,133

(22) PCT Filed: Jul. 30, 2008

(86) PCT No.: PCT/US2008/071519
§ 371 (c)(1),
(2), (4) Date: Jan. 27, 2011

(87) PCT Pub. No.: WO2010/014083
PCT Pub. Date: Feb. 4, 2010

(65) Prior Publication Data
US 2013/0213385 A1 Aug. 22, 2013

(51) Int. Cl.
*A47J 37/12* (2006.01)
*F23D 14/08* (2006.01)

(52) U.S. Cl.
CPC .......... *A47J 37/1247* (2013.01); *F23D 14/085* (2013.01)

(58) Field of Classification Search
CPC . A47J 37/1242; A47J 37/1247; A47J 27/026; F23D 14/085; F23C 3/002
USPC ................ 126/391.1, 357.1; 99/403; 431/329
See application file for complete search history.

(56) References Cited

U.S. PATENT DOCUMENTS

| | | | |
|---|---|---|---|
| 929,946 A | 8/1909 | Helm | |
| 3,084,736 A * | 4/1963 | Mentel et al. | 431/329 |
| 4,259,058 A * | 3/1981 | Gottwald et al. | 431/220 |
| 4,838,244 A | 6/1989 | Giles, Sr. et al. | |
| 5,253,566 A | 10/1993 | McCabe et al. | |
| 5,398,668 A | 3/1995 | Daneshvar et al. | |
| 5,704,777 A * | 1/1998 | Measom | 431/329 |
| 6,095,037 A | 8/2000 | Savage et al. | |
| 6,152,022 A * | 11/2000 | Savage et al. | 99/403 |
| 6,178,964 B1 | 1/2001 | McFadden et al. | |
| 6,196,118 B1 | 3/2001 | Savage et al. | |
| 6,209,536 B1 | 4/2001 | McNamara | |
| 6,659,765 B1 * | 12/2003 | Sen-Yu | 431/328 |

(Continued)

OTHER PUBLICATIONS

International Search Report PCT/US2008/071519: published Feb. 4, 2010.

*Primary Examiner* — Alissa Tompkins
*Assistant Examiner* — Benjamin W Johnson
(74) *Attorney, Agent, or Firm* — Tarolli, Sundheim, Covell & Tummino LLP

(57) ABSTRACT

A deep fryer apparatus including a gas burner for heating cooking oil. The burner includes a venturi inlet for receiving fuel and combustion air that communicates with a main chamber having an expanding cross-section. A balancing plate is disposed in a flow path of the fuel air mixture that is located intermediate the inlet and the outlet. The balancing plate defines a region of reduced cross-section in the flow path. A flame cap located at the outlet defines at least one secondary chamber between itself and the balancing plate that defines a flow path cross-section that is larger than the cross-section of the flow path at the balancing plate. The balancing plate is preferably tapered to compensate for variations in the length of the flow path due to an angled orientation between the burner inlet and the outlet.

23 Claims, 4 Drawing Sheets

(56) References Cited

U.S. PATENT DOCUMENTS

| | | |
|---|---|---|
| 6,736,131 B2 | 5/2004 | Yamamoto et al. |
| 6,817,355 B1 | 11/2004 | Hawkins et al. |
| 2003/0127088 A1* | 7/2003 | Takeda et al. .............. 126/391.1 |
| 2006/0003279 A1* | 1/2006 | Best .............................. 431/328 |
| 2006/0281033 A1* | 12/2006 | Reale et al. ....................... 431/3 |
| 2007/0089732 A1* | 4/2007 | Ricord et al. .............. 126/357.1 |
| 2007/0151464 A1* | 7/2007 | Oztiryaki ........................ 99/403 |
| 2008/0236564 A1* | 10/2008 | Burtea et al. ................ 126/39 K |

* cited by examiner

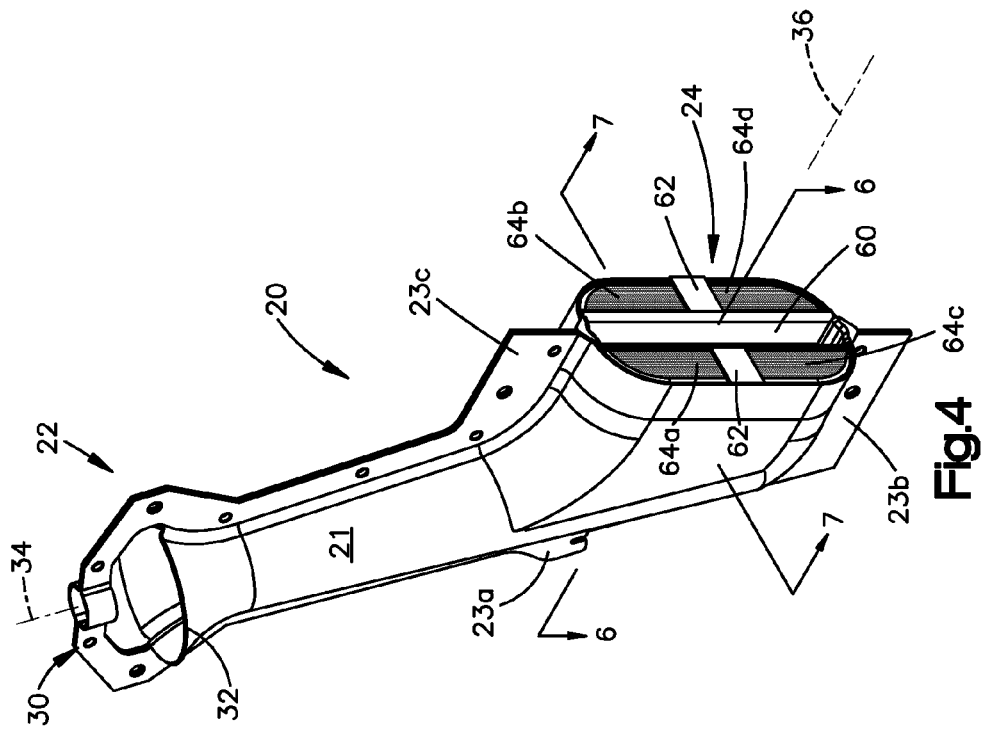
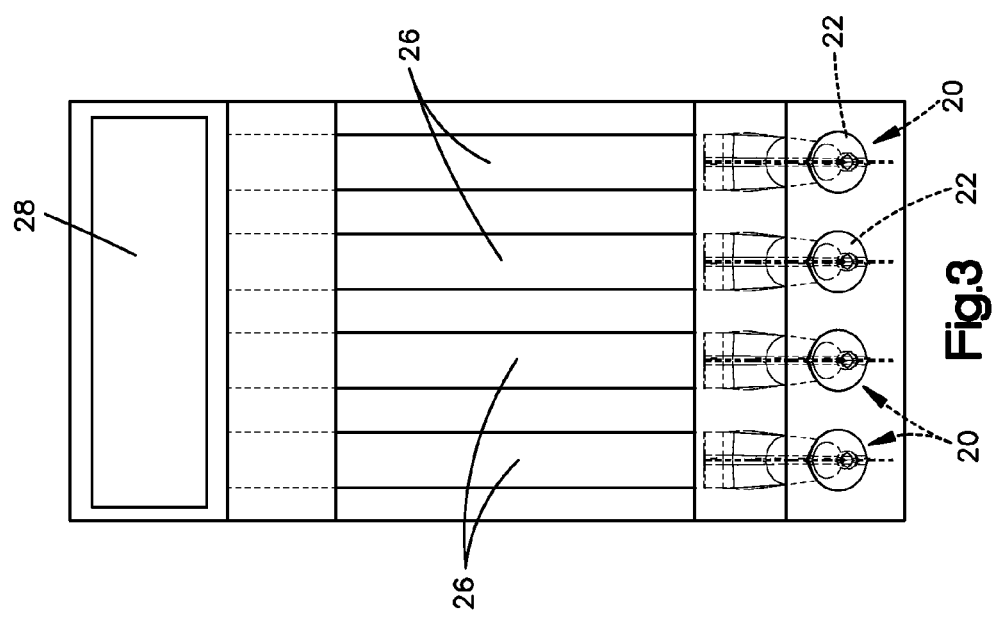

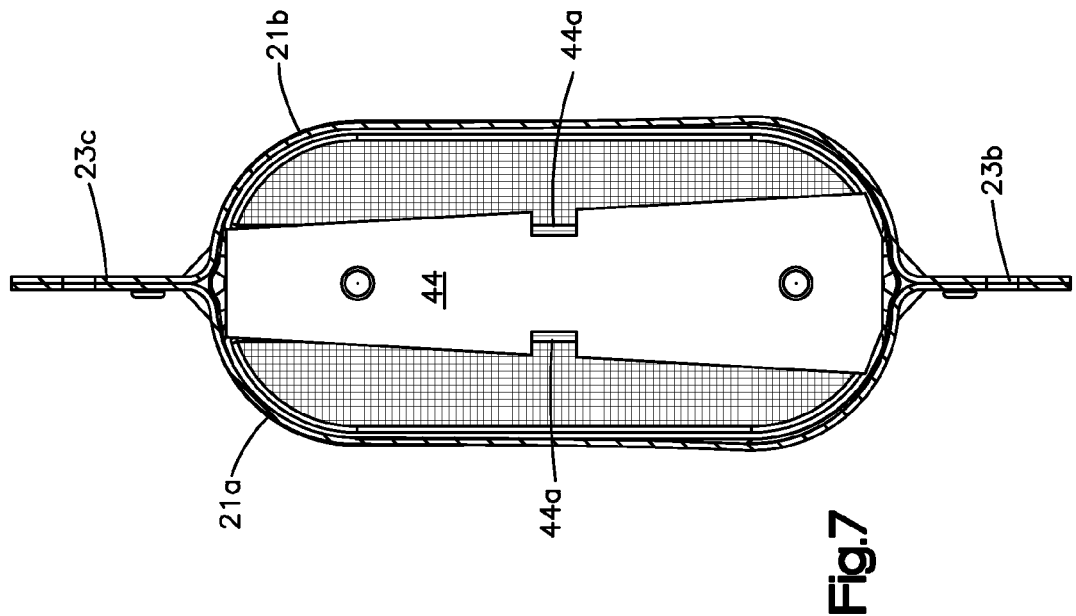
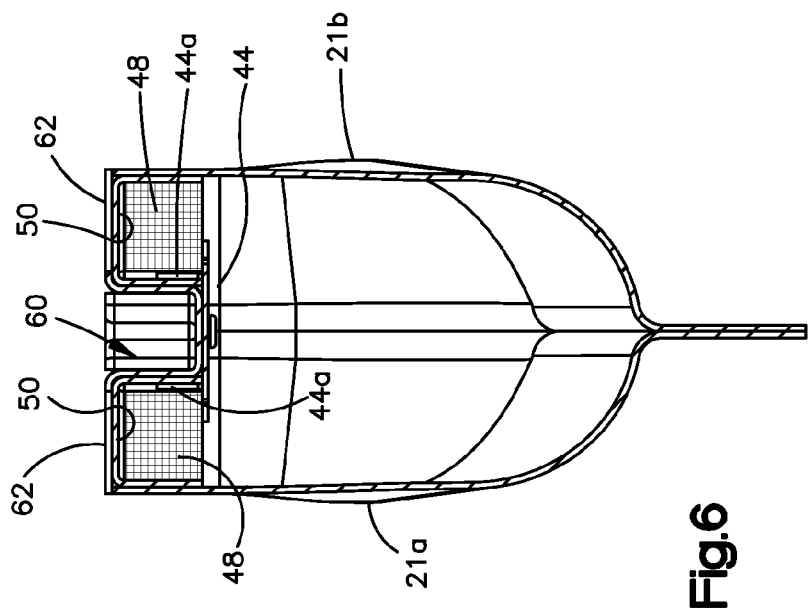

BURNER

RELATED APPLICATION

This application being submitted under 35 U.S.C. 371 claims priority from International Application No. PCT/US08/071519, filed Jul. 30, 2008 the entirety of which is incorporated herein by reference.

TECHNICAL FIELD

The present invention relates generally to deep fryers and, in particular, to a gas burner, especially adapted to operate in a deep fryer.

BACKGROUND ART

Commercial deep fryers are commonly used in fast food restaurants to cook food items such as fries, chicken, etc. Most of these fryers include a reservoir of cooking oil that is heated to a predetermined temperature. In many of these fryers, the oil is heated by a gas burner which fires into a heat exchange tube that passes through the cooking oil reservoir. The flame and combustion products heat the wall of the heat exchange tube which, in turn, transfers this heat to the cooking oil.

Gas-fired fryer designs require very rapid heat release (short flame) in order to take advantage of the very short heat exchange tube/chamber that is typically found in a fryer design. These factors generally require high levels of primary aeration and a relatively large burner outlet. Because of the relatively small space available in a deep fryer, the gas burners used in these appliances need to have an inlet that is at some angle to the burner outlet which may be up to 90° in some cases. In order to maintain a high primary aeration, the burner has to be very free flowing or have very little internal restriction to flow. It is also important to balance the flow of the gas/air mixture through the discharge end of the burner in order to maintain a consistent temperature profile and good secondary air distribution for clean combustion. Balancing the flow is difficult because it involves putting a restriction into the burner in areas of high flow, which reduces burner performance due to lower primary aeration.

DISCLOSURE OF INVENTION

The present invention provides a new and improved gas burner for a deep fryer apparatus. The burner is used to heat a heat exchanger located in a cooking oil reservoir forming part of the fryer apparatus. In the illustrated embodiment, the burner includes a venturi inlet for receiving fuel and combustion air; the venturi inlet communicates with a main chamber. A balancing plate is disposed in a flow path of the fuel and combustion air and is located intermediate the inlet and the outlet of the burner. The balancing plate defines a region of reduced cross-section in the flow path. A flame cap is located at the outlet of the burner and defines, between itself and the balancing plate, at least one secondary chamber having a flow path cross-section that is larger than the flow path cross-section at the location of the balancing plate.

According to a more preferred embodiment, the burner includes a venturi inlet having an axis disposed at an angle with respect to an axis of the burner outlet. The burner main chamber located downstream of the venturi inlet has an expanding cross-section that causes a reduction in velocity of the fuel/air mixture. An orifice holder, preferably integrally formed with a burner housing mounts a gas orifice spaced from the venturi inlet. The fuel/air mixture is mixed in the main chamber. The fuel/air mixture is then split and sent across the multi-directional balancing plate, which cause the velocity of the fuel/air mixture to increase. After passing the balancing plate, the mixture enters into the secondary plenum chambers where the velocity is again reduced. This configuration creates additional mixing of the fuel/air mixture and the flow is further balanced and stabilized.

According to a feature of the invention, the balancing plate also serves as a structural component to securely hold burner port sections located at the burner outlet.

According to another feature of the invention, a flame cap is located at the discharge outlet and at least partially divides the discharge area of the burner into four quadrants. The spacing between these quadrants is designed to allow secondary air to reach the inner portion of the flame in order to maintain clean combustion throughout the range of burner operation.

According to a feature of the invention, the burner housing is comprised of metal stampings that are preferably mirror images of each other and are held together by upset fastening, rivets or welding.

Additional features of the invention and a fuller understanding will be obtained by reading the following detailed description made in connection with the accompanying drawings.

BRIEF DESCRIPTION OF DRAWINGS

FIG. 3 is a top view of the deep fat fryer shown in FIG. 2;

FIG. 4 is a perspective view of a gas burner constructed in accordance with a preferred embodiment of the invention;

FIG. 6 is a sectional view of the gas burner as seen from the plane indicated by the line 6-6 in FIG. 4; and FIG. 7 is a sectional view of the burner as seen from a plane indicated by the line 7-7 in FIG. 4.

BEST MODE FOR CARRYING OUT THE INVENTION

Figure 1:
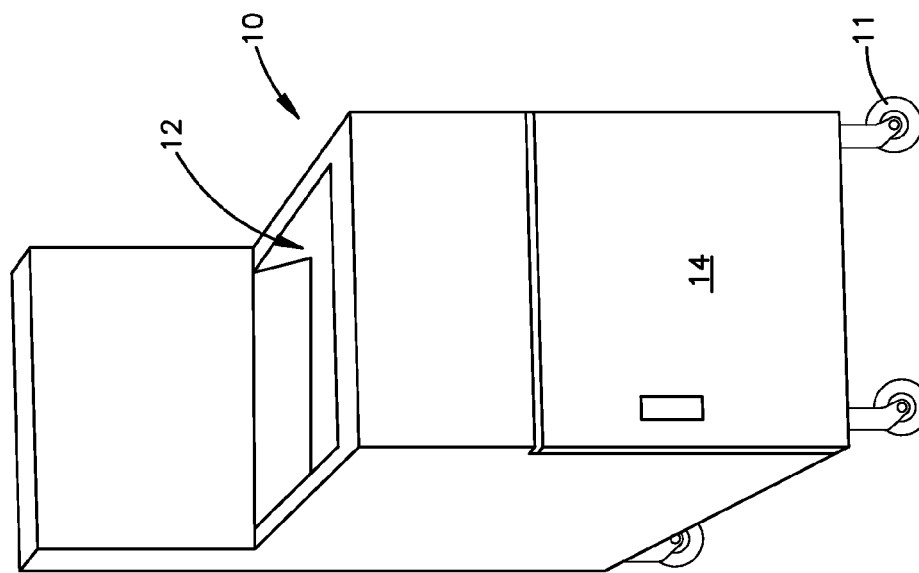
FIG. 1 is a perspective view of a typical deep fat fryer.

FIG. 1 illustrates the overall construction of a deep fryer that is typically used in fast food restaurants to cook french fries, etc. In general, the fryer of the type illustrated in FIG. 1 includes a cabinet 10 which may sit atop wheels 11 to provide mobility. This fryer includes a reservoir indicated generally by the reference character 12 for cooking oil, etc., which is heated. Foods to be prepared, i.e., french fries are placed in the heated reservoir of cooking oil and are cooked thereby. The fryer 10 may include an access door 14 by which access to the oil reservoir, heating controls and heating apparatus is provided.

Figure 2:
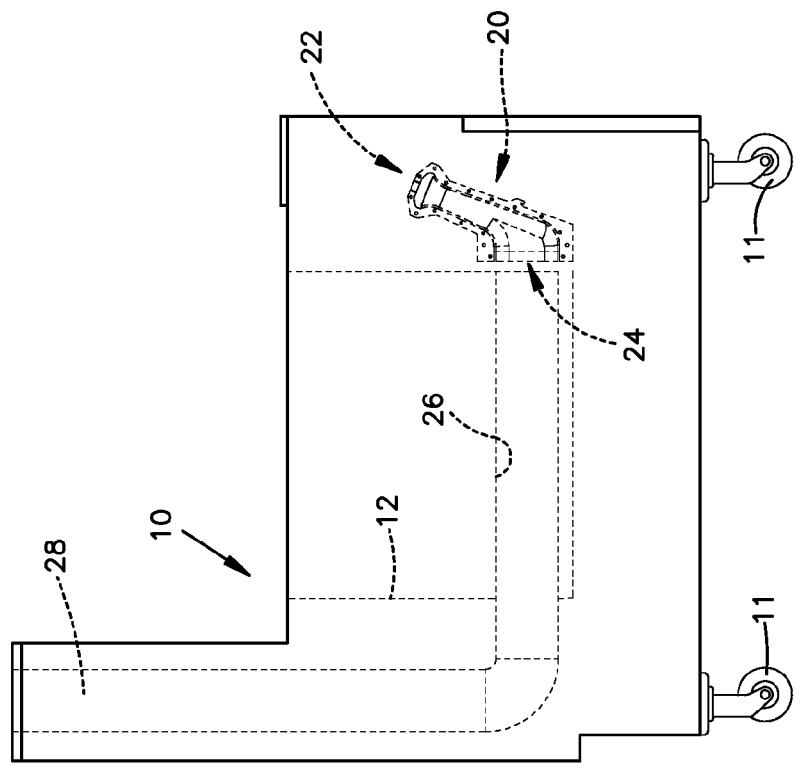
FIG. 2, is a side view of a deep fat fryer which includes a gas burner constructed in accordance with a preferred embodiment of the invention.

Referring also to FIG. 2, the fryer 10 is shown with a gas burner 20 that is constructed in accordance with the a preferred embodiment of the invention.

Referring also to FIG. 3, the burner 20 includes an inlet indicated generally by the reference character 22 through which the burner receives fuel in the form of combustible gas and combustion air. The outlet side of the burner indicated generally by the reference character 24 is mounted at one end of a heat exchanger or tube 26. The heat exchange tube 26 is located within the cooking oil reservoir 12. As seen best in FIG. 2, the burner 20 fires into the right end of the heat exchange tube 26 (as viewed in FIG. 2). The products of combustion flow through the heat exchange tube 26 and are discharged through a flue pipe 28. As the hot products of combustion pass through the tube 26, the tube walls are heated which, in turn, heat the oil in the cooking oil reservoir 12 that surrounds the heat exchange tube 26.

As seen best in FIG. 3, in the illustrated embodiment, four gas burners 20, with associated heat exchange tubes 26, are mounted within the fryer 10. Various method can be used to removably mount the burners 20 in the fryer. The invention, however, should not be limited to the number of burners/heat exchange tubes shown. The number of burners/heat exchange tubes used is dependent upon the capacity of the cooking oil reservoir. The larger the reservoir the more burners required.

Figure 5:
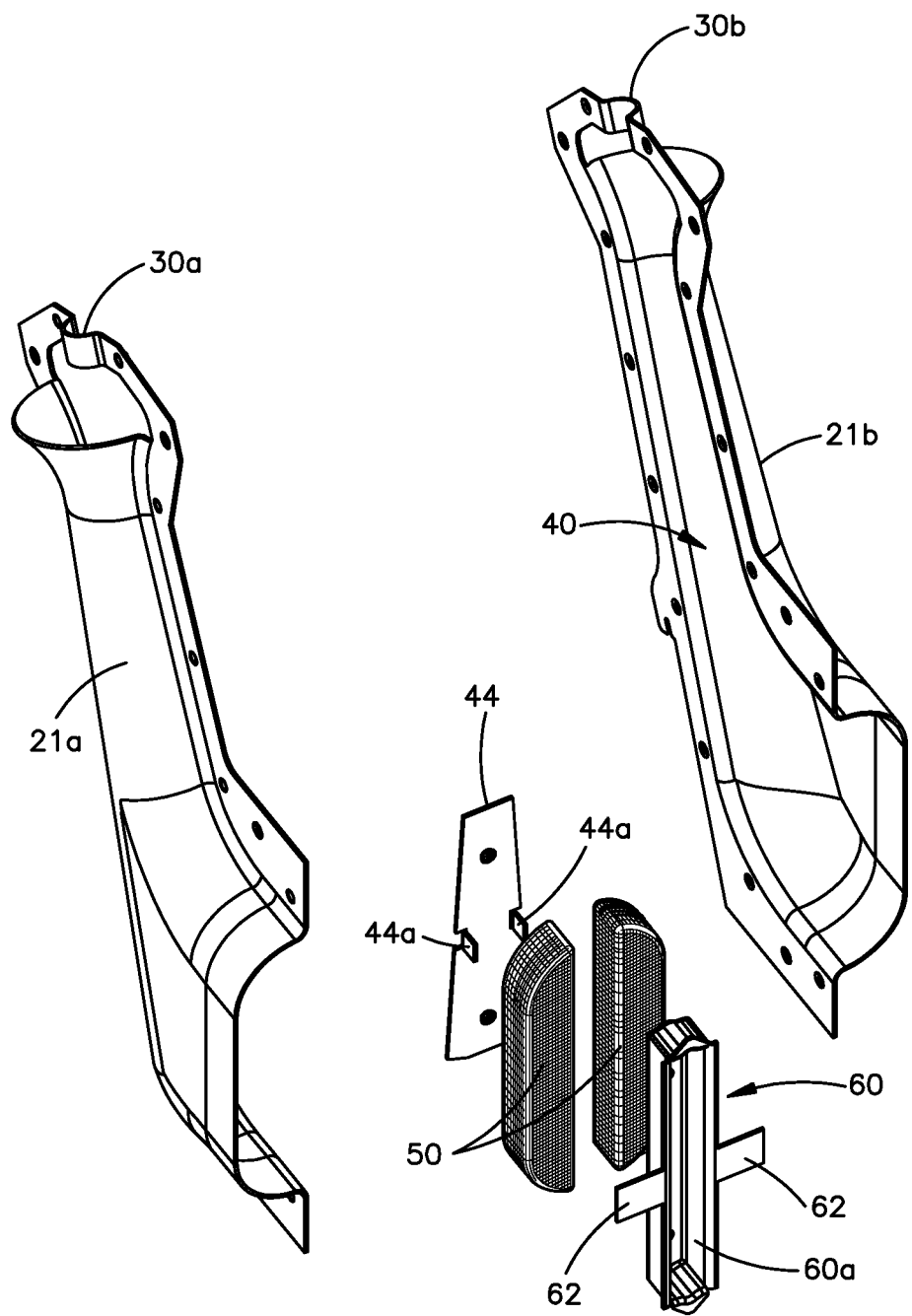
FIG. 5 is an exploded view of the gas burner shown in FIG. 4.

FIGS. 4 and 5 illustrate the overall construction of a gas burner 20 constructed in accordance with a preferred embodiment of the invention. As seen best in FIG. 4, the inlet end 22 of the burner includes an integrated gas orifice holder 30 and a venturi opening 32 through which gas and combustion air enter the gas burner. In the illustrated embodiment, the orifice holder 30 is centered with respect to the venturi inlet 32.

The discharge or flame end 24 of the burner is oval in shape and is located below the level of the venturi inlet 32 when the burner is installed in the fryer. Due to space constraints in a typical fryer, an axis 34 of the inlet opening 32 is located at an angle with respect to an axis 36 of the outlet 24. In the illustrated embodiment, the angle between these axes is 68°. For some applications, the angle between these axes may be any angle up to 90°.

The burner 20 is defined by a burner housing 21, which, in the illustrated embodiment, is a metal stamping. As seen best in FIG. 5, the housing 21 is made up of two metal stampings 21a, 21b, which are mirror images of each other and which are joined together by upset fastening, rivets, spot welds or other fasteners.

As seen in FIG. 5, each stamping 21a, 21b defines respective portions 30a, 30b of the orifice holder 30 (see FIG. 4), as well as the venturi inlet 32 and the perimeter of the burner outlet 24. When the housing halves are joined together, the circular gas orifice holder 30 is defined in which a conventional gas orifice (not shown) is positioned.

When the housings 21a, 21b are joined, they together define an internal main chamber, a portion of which is indicated generally by the reference character 40 in FIG. 5. The chamber 40 initially receives the gas discharged by the gas orifice (not shown) and the combustion air entering the venturi 32. The gas/combustion air initially mixes in the venturi 32. Additional mixing occurs in the main chamber 40.

In operation, due to the expanding cross-sectional area of the main chamber 40, the fuel and air traveling through the main chamber 40 is mixed and the velocity is reduced.

Because it is important to maintain a balanced flow, a multi-directional balancing plate 44 is located near the discharge end 24 of the burner. The balancing plate is preferably tapered in the vertical direction (as viewed in FIG. 5) so that it poses a slightly greater restriction to gas/air flowing near the bottom of the outlet as compared to gas/air flowing at the upper portion of the outlet.

Referring also to FIG. 5, as the gas mixture leaves the main chamber 40, it is split and sent across the multi-directional balancing plate 44. The reduction in cross-sectional area of the burner where the balancing plate is located, increases the velocity of the fuel/air mixture. Referring in particular to FIG. 6, after the fuel/air mixture passes the balancing plate 44, the mixture enters into secondary plenum chambers 48 (shown best in FIG. 6) that have a larger cross-sectional area as compared to the cross-sectional area of the opening defined by the balancing plate 44. This reduces the velocity of the fuel/air mixture and creates additional mixing, thus, further balancing and stabilizing the flow.

Immediately downstream of the balancing plate 44 are two cup-shaped screens 50 that are located within, and at least partially define, the secondary plenum chambers 48. A flame cap 60, including two horizontal support tabs 62, is mounted at the outlet end 24 of the burner. The tabs are preferably tack welded to the outlet of the housing 21. The balancing plate 44 not only serves to balance flow, but acts to secure the screen cups 50 to the flame cap via bent tabs 44a. This construction facilitates burner assembly because the balancing plate 44, screen cups 50 and flame cap 60 form a single subassembly that is mounted in the outlet of the burner and secured there by the tack welded tabs 62. In particular, the flame cap 60 is cup-shaped and includes an elongate center body 60a portion. The cup-shaped screen elements 50 are located on either side of the flame cap body 60a and are held there by the bent clamping tabs 44a that form part of the balancing plate 44.

With this configuration, the discharge area of the burner is divided into four quadrants indicated by the reference characters 64a-d in FIG. 4. The use of secondary chambers 50 and the four quadrants and their spacing allow secondary air to reach the inner portion of the flame in order to maintain clean combustion throughout the range of burner operations.

With the present invention, a flow path for the fuel/air mixer is defined between the venturi inlet 32 and the outlet 24, which first expands in cross-section as the mixture travels through the main chamber 40 and then is reduced in cross-section by the balancing plate 44. Downstream of the balancing plate, the cross-section of the flow path again increases in the secondary chambers 48. With this configuration, the changes in flow path cross-section (which change the velocity of the gas/air mixture), coupled with the configuration of the balancing plate (which, in effect, defines a flow path cross-section that tapers from top to bottom), promote mixing of the fuel/air mixture while also maintaining balanced flow.

It should be noted here, the reference to "top" and "bottom" of the burner should not be construed as limiting the configuration, placement or orientation of the burner. In the illustrated embodiment, the burner is shown with the inlet 22 pointed upwardly such that inlet opening is above the discharge of outlet 24. The burner, however, can be mounted in various orientations, i.e., with the inlet opening 22 pointed downwardly or to the side. Because the inlet is located on an axis 34 that is at an angle with respect to an axis 36 of the outlet 24, the length of the flow path between the inlet and the outlet is longer at the bottom portion of the burner (when viewed in the orientation shown in FIG. 4). The tapered balancing plate 44 compensates for the variation in length of the flow path by posing an increasingly larger restriction as the flow path length increases. Accordingly, the references to "top" and "bottom" of the burner merely facilitate the explanation.

The housing portions 21a, 21b, either alone or together, define mounting tabs 23a, 23b, 23c by which the burner is mounted in the fryer.

In the preferred and illustrated embodiment, the housing 21, the balancing plate 44 and flame cap 60 are made from aluminized steel. The screens are made from 16×16 square weave, stainless steel wire cloth. The materials disclosed above, however, should not be construed as limiting the invention. It should be understood by those skilled in the art that the principles of this invention can be applied to a burner made of cast components, as well as burners made of other materials.

Although the invention has been described with a certain degree of particularity, it should be understood that those skilled in the art can make various changes to it without departing from the spirit or scope of the invention as hereinafter claimed.

The invention claimed is:

1. An apparatus for frying foods, comprising:
   a) structure defining a reservoir of cooking oil;
   b) at least one heat exchanger disposed in said reservoir for heating cooking oil in said reservoir;
   c) said heat exchanger having an inlet side and an outlet side, said outlet side communicating with a discharge conduit;
   d) a gas burner located at said inlet side of said heat exchanger and arranged such that products of combustion travel through said heat exchanger from said inlet side to said outlet side, whereby said heat exchanger is heated;
   e) said burner, comprising:
      i) a burner housing defining a main chamber having an expanding cross-section and at least one secondary plenum chamber downstream with respect to said main chamber;
      ii) a venturi inlet for receiving fuel and combustion air, said venturi inlet communicating with said main chamber;
      iii) a balancing plate disposed in a flow path of said fuel and combustion air and located intermediate said inlet and said secondary plenum chamber, said balancing plate defining a region of reduced cross-section in said flow path;
      iv) a flame cap located at an outlet of said burner and at least partially defining said secondary plenum chamber, said outlet end of said burner being oval in shape and having an outer end adjacent a combustion surface where said combustion air and fuel is combusted and said secondary plenum chamber located upstream from said combustion surface and having a flow path cross-section that is larger than the flow path cross-section at the location of said balancing plate.

2. The apparatus of claim 1 wherein said flame cap divides the outlet end of said burner into four quadrants and said balancing plate is tapered so that it poses a greater restriction near a bottom of said flow path as compared to an upper portion of said flow path when said venturi inlet is located at a level higher than said outlet end of said burner.

3. The apparatus of claim 1 further including screen elements located between said balancing plate and said flame cap and said balancing plate including clamping tabs, said screen elements defining said combustion surface.

4. The apparatus of claim 3 wherein said tabs of said balancing plate clamp said screen elements to a body portion of said flame cap.

5. A gas burner for a deep fryer apparatus, comprising:
   a) a venturi inlet for receiving fuel and combustion air, said venturi inlet communicating with a main chamber having an expanding cross-section;
   b) at least one secondary plenum chamber downstream of said main chamber;
   c) a flow balancing plate disposed in a flow path of said fuel and combustion air and located intermediate said inlet and said secondary plenum chamber, said balancing plate defining a region of reduced cross-section in said flow path;
   d) a screen element defining a combustion surface for said combustion air and fuel; and,
   e) a flame cap located at a burner outlet of said burner and at least partially defining said at least one secondary plenum chamber, said secondary plenum chamber located upstream from said combustion surface and said secondary plenum chamber having a flow path cross-section that is larger than the flow path cross-section at the location of said balancing plate.

6. The gas burner of claim 5 wherein said flame cap divides the burner outlet into four quadrants.

7. The gas burner of claim 5 wherein said balancing plate is tapered to pose a varying restriction in said flow path, the taper being related to a varying flow path length defined by the burner.

8. The gas burner of claim 5 wherein said screen element is cup-shaped and is clamped to said flame cap by a tab forming part of said balancing plate, such that said balancing plate, screen element and flame cap define a sub-assembly.

9. The apparatus of claim 5 wherein said gas burner is at least partially defined by a housing comprised of at least two metal stampings joined together, said housing defining said venturi inlet, said main chamber and said burner outlet.

10. The gas burner of claim 5 wherein said venturi inlet is located on an axis that is angled with respect to an axis of said burner outlet.

11. The gas burner of said claim 9 wherein said metal stampings are comprised of aluminized steel and are joined together using upset fastening.

12. The gas burner of claim 10 wherein said venturi inlet axis is angled substantially 68 degrees with respect to said burner outlet axis.

13. The apparatus of claim 9 wherein said housing defines a gas orifice holder.

14. The apparatus of claim 13 wherein each stamping defines a portion of said gas orifice holder.

15. A gas burner for a deep fryer apparatus, comprising:
   a) an inlet for receiving fuel and combustion air, said inlet communicating with a main chamber;
   b) at least one secondary plenum chamber downstream of said main chamber;
   c) a balancing plate disposed in a flow path of said fuel and combustion air and located intermediate said inlet and said secondary plenum chamber, said balancing plate defining a region of reduced cross-section in said flow path;
   d) a screen element defining a combustion surface for said fuel and combustion air and a flame cap located at an outlet of said burner and at least partially defining said at least one secondary chamber upstream from said combustion surface, said secondary plenum chamber having a flow path cross-section that is larger than the flow path cross-section at the location of said balancing plate.

16. The gas burner of claim 15 wherein said inlet is a venturi inlet and said main chamber has an expanding cross-section.

17. The gas burner of claim 15 further including a second screen element such that two secondary chambers are defined.

18. The apparatus of claim 3 wherein said screen elements are made from 16×16 square weave, stainless steel wire cloth.

19. The gas burner of claim 5 wherein said screen element is made from 16×16 square weave, stainless steel wire cloth.

20. The gas burner of claim 15 further including a flame cap located at said outlet of said burner and at least partially defining said at least one secondary plenum chamber.

21. The gas burner of claim 20 wherein said screen element is cup-shaped and said flame cap and balancing plate cooperate to mount said screen element.

22. The gas burner of claim 5 wherein said burner includes two cup-shaped screen elements, each of said screen elements at least partially defining an associated secondary plenum chamber.

23. The gas burner of claim 17 wherein said screen elements are cup-shaped.

* * * * *